(12) United States Patent
Hecker et al.

(10) Patent No.: US 10,924,476 B2
(45) Date of Patent: Feb. 16, 2021

(54) SECURITY GESTURE AUTHENTICATION

(71) Applicant: NCR Corporation, Duluth, GA (US)

(72) Inventors: Weston Lee Hecker, Bismarck, ND (US); Nir Veltman, Johns Creek, GA (US); Yehoshua Zvi Licht, Alpharetta, GA (US)

(73) Assignee: NCR Corporation, Duluth, GA (US)

( * ) Notice: Subject to any disclaimer, the term of this patent is extended or adjusted under 35 U.S.C. 154(b) by 287 days.

(21) Appl. No.: 15/825,295

(22) Filed: Nov. 29, 2017

(65) Prior Publication Data

US 2019/0166119 A1  May 30, 2019

(51) Int. Cl.
| | | |
|---|---|---|
| *H04L 29/06* | (2006.01) | |
| *G06F 21/32* | (2013.01) | |
| *G06K 9/00* | (2006.01) | |
| *H04L 9/32* | (2006.01) | |
| *H04W 12/06* | (2021.01) | |
| *H04W 12/00* | (2021.01) | |

(52) U.S. Cl.
CPC .......... *H04L 63/0861* (2013.01); *G06F 21/32* (2013.01); *G06K 9/00288* (2013.01); *G06K 9/00335* (2013.01); *G06K 9/00892* (2013.01); *G06K 9/00899* (2013.01); *G06K 9/00926* (2013.01); *H04L 9/3231* (2013.01); *H04L 63/18* (2013.01); *H04W 12/00503* (2019.01); *H04W 12/00504* (2019.01); *H04W 12/06* (2013.01)

(58) Field of Classification Search
CPC ... H04L 63/0861; G06F 21/32; G06K 9/0288; G06K 9/00335; G06K 9/00892; G06K 9/3231

USPC .......................................................... 713/186
See application file for complete search history.

(56) References Cited

U.S. PATENT DOCUMENTS

| | | | | |
|---|---|---|---|---|
| 7,130,454 B1* | 10/2006 | Berube | .............. | G06K 9/00234 382/118 |
| 8,457,367 B1 | 6/2013 | Sipe et al. | | |
| 9,607,138 B1* | 3/2017 | Baldwin | ................. | G06F 21/32 |
| 2008/0170776 A1* | 7/2008 | Albertson | ............... | G06F 21/35 382/154 |
| 2010/0122167 A1* | 5/2010 | Ryu | .................... | G06F 3/04883 715/716 |
| 2012/0114194 A1* | 5/2012 | Kim | ................... | G06K 9/00255 382/115 |

(Continued)

OTHER PUBLICATIONS

Almuairfi Sadiq: "A novel image-based implicit password authentication system (IPAS) for mobile and non-mobile devices—ScienceDirect", Jul. 7, 2012 (Jul. 7, 2012), pp. 108-116, XP055565792, Elsevier Retrieved from the Internet: URL:https://www.sciencedirect.com/science/article/pii/S0895717712001719 [retirieved on Mar. 7, 2019] * figures 4,5 *.

(Continued)

*Primary Examiner* — Dant B Shaifer Harriman
(74) *Attorney, Agent, or Firm* — NCR Corporation (57) ABSTRACT

Real-time facial recognition is augmented with an additional second biometric-based security gesture authentication. Facial biometric authentication is performed on a user for access to a resource. When facial authentication is successful, an image or a video of the user is captured performing a security gesture. Pixel values from the image or video are compared against expected pixel values for the security gesture and when the comparison is within a threshold, the user is provided access to the resource.

20 Claims, 7 Drawing Sheets

(56) References Cited

U.S. PATENT DOCUMENTS

| | | | | |
|---|---|---|---|---|
| 2012/0223952 A1* | 9/2012 | Kanemaru | ............. | G06T 13/40 345/473 |
| 2013/0015946 A1* | 1/2013 | Lau | ........................ | G06F 21/32 340/5.2 |
| 2013/0061304 A1* | 3/2013 | Bruso | ..................... | G06F 21/34 726/7 |
| 2013/0254874 A1* | 9/2013 | Xu | .......................... | G06F 21/32 726/17 |
| 2014/0165187 A1* | 6/2014 | Daesung | ................. | G06F 21/32 726/19 |
| 2014/0270412 A1* | 9/2014 | Ma | ..................... | G06K 9/00221 382/118 |
| 2016/0055323 A1* | 2/2016 | Stuntebeck | ............. | G01P 13/00 726/17 |
| 2016/0057138 A1* | 2/2016 | Hoyos | ............. | G06Q 20/40145 726/7 |
| 2016/0132670 A1* | 5/2016 | Salama | ................... | G06F 21/32 726/19 |
| 2017/0076144 A1* | 3/2017 | Iwasaki | ............. | G06K 9/00288 |

OTHER PUBLICATIONS

EP Search Report—dated Mar. 14, 2019.

\* cited by examiner

SECURITY GESTURE AUTHENTICATION

BACKGROUND

User authentication is continuously changing and being enhanced to thwart fraudulent attempts of imposters that pose as a true user.

Biometric authentication is believed to be a strong authentication technique. Consequently, biometric authentication has been embraced and adopted by many industries. The two most popular biometric authentication mechanism are fingerprint authentication and facial authentication.

As with any authentication technique, biometric authentication is not foolproof and can be circumvented by inexpensive and ingenious techniques employed by hackers. For example, hackers have figured out that facial authentication can be tricked through use of a photograph or video of the true user, which is presented in front of the camera of the authenticating device for purposes of authenticating as the true user and gaining access to resources and assets accessible only to the true user.

The issue of spoofing a user's true identity through a photograph or a video is becoming particularly problematic for Self-Service Terminals (SSTs), such as Automated Teller Machines (ATMs), where a spoofed user's identity can result in substantial monetary losses for financial institutions and/or users.

SUMMARY

In various embodiments, methods and a system for security gesture authentication are presented.

According to an embodiment, a method for security gesture authentication is provided. Specifically, and in one embodiment, a facial authentication is processed on a face of a user. Next, a security gesture authentication is performed based on a gesture made by the user. Finally, the user is provided access to a resource when both the facial authentication and security gesture authentication are successful.

DETAILED DESCRIPTION

Figure 1A:
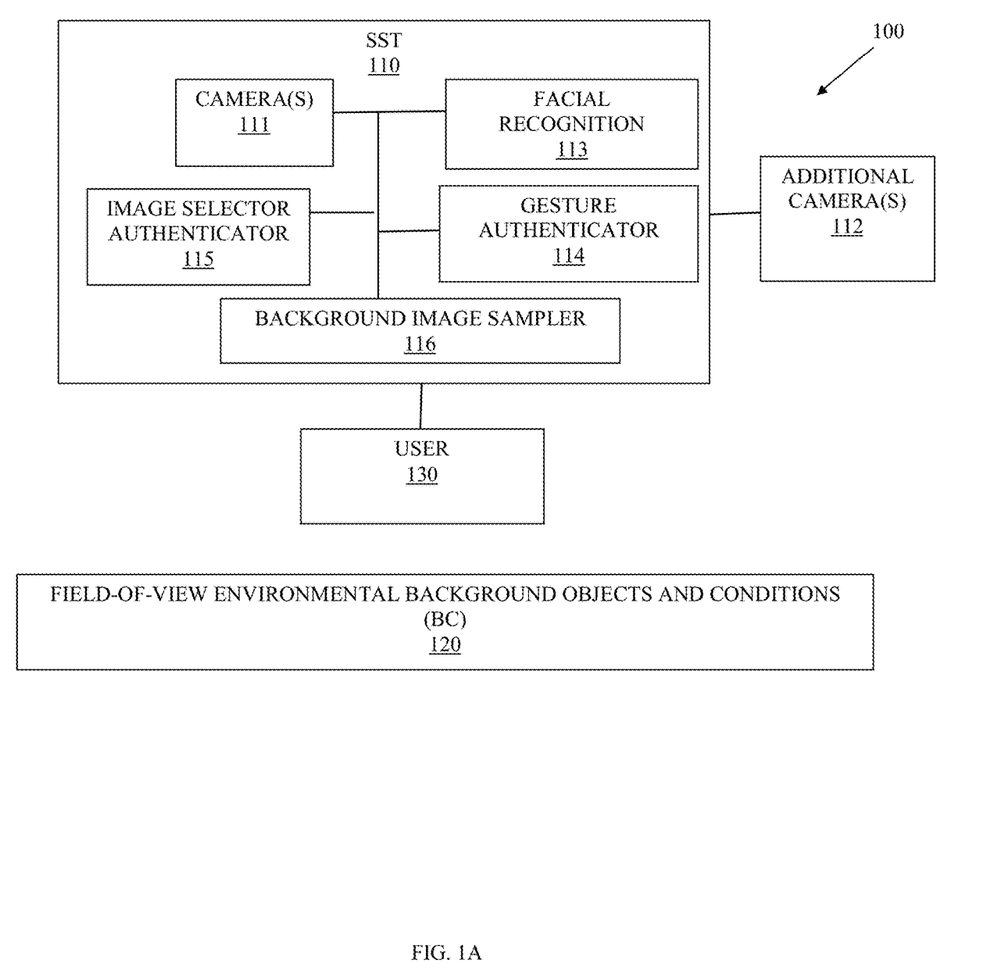
FIG. 1A is a diagram of a system for security gesture authentication, according to an example embodiment.

FIG. 1A is a diagram of a system 100 for security gesture authentication, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the security gesture authentication teachings presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for security gesture authentication can be implemented in all, or some combination of the components shown in different hardware computing devices having one or more hardware processors.

As used herein and below, the terms "user," "consumer," and "customer" may be used synonymously and interchangeably.

The system 100 includes: a SST 110 having one or more cameras 111, facial recognition software module 113 ("facial recognition 113"), and a gesture authentication software module 114 ("gesture authenticator 114"). Optionally, the system 100 also includes: an image selector authentication software module 115 ("image selector authenticator 115"), a background image sampler software module 116 ("background image sampler 116"), and one or more additional external cameras 112 ("additional cameras 112") whose image/video output is accessible to the SST 110.

Optionally, the system 100 includes a machine learning algorithm that trains to learn the physical environment of objects, structures, and lighting that are within the field of view of the camera 111 and/or the additional cameras 112. These objects and structures and lighting conditions are referred to as the field-of-view (FOV) environmental background objects and conditions 120 ("BC" 120).

Initially, a user 130 that desires to be authenticated at the SST 110 registers a photograph, comes into an enterprise for a photograph, or provides a video of a mobile device for purposes of registering the user's face for facial authentication. The actual image (photograph) of the user is cropped such that just the user's face is provided with the registered image (no background image pixels are noted or used in the user's facial image).

Subsequently, the user 130 attempts to authenticate at the SST 110 for a transaction for purposes of gaining access to a user's account (such as for withdrawing funds from the user's account). The camera 111 captures an image of the user's face and samples pixels (for example, pixel groupings F1-F6 shown in the FIG. 1B) from the image. The registered image of the user's face is then compared against the sampled pixels by the facial recognition 113 for purposes of performing initial biometric facial authentication on the user 130.

Typically, this is all the authentication that is done by biometric-based authenticators; however, this is not the case with the various embodiments presented herein.

Specifically, the system 100 performs an initial first factor biometric-based authentication by processing facial authentication of the facial recognition 113. At least one additional second biometric-based authentication is processed by the gesture authenticator 114 and as many as two-additional factors can be processed through the image selector authenticator 115 and the background image sampler 116.

The gesture authenticator 114 can be configured to authenticate a user-performed gesture in a variety of manners. For example, during registration of the user's facial image an additional registration can be requested of the user 130 to either select from a list of pre-defined gestures (presented to the user for selection) or user-defined and created gestures (the cameras 111 capture a user-initiated and created gesture). The user 130 can be asked, during registration, to perform in front of the camera 111, each of the gestures selected by the user 130 and images are captured for each gesture to sample and record pixels of the user's face and the gesture (for example, additional pixel groupings F7-F9 in the FIG. 1D).

When the user 130 has authenticated through the first biometric factor for a given transaction at the SST 110, the gesture authenticator 114 asks the user 130 to perform a specific security gesture or asks the user 130 to perform any of the registered security gestures for purposes of authenticating the user 130 for a second biometric-based authentication processed on the user-performed gesture. For example, the FIG. 1D illustrates a security gesture made by the user 130 in which the user 130 makes a closed right first that is placed adjacent to a right side of the user's head with the user's index and middle finger placed above and below the user's right eye. Pixels F7-F9 are processed against the image taken by the camera 111 for the security gesture, and the gesture authenticator 114 determines based on the user's registered security gesture images whether the user 130 is authenticated for the second biometric-based authentication.

It is noted that the security gesture can be a variety of gestures and/or facial expressions made by the user 130. For example, a gesture may be the user 130 closing one eye, squinting, covering one eye with a closed first or some number of the user's fingers, etc. The gesture can include one or both hands of the user 130 or selective fingers of the user 130 from one or both hands of the user 130. The gesture can also be a motion made by the user 130 or a sequence of motions captured in video by the camera 111.

Capturing a second biometric-based factor from the user 130 for authentication significantly improves security, since facial authentication alone can be duped by photographs placed in front of a camera where facial authentication is performed. The gesture second biometric-based authentication factor significantly reduces the risk of circumventing facial-only authentication.

In an embodiment, the gesture authenticator 114 animates a character that is presented on a display of the SST 110 that visually illustrates the security gesture that the gesture authenticator 114 wants the user 130 to perform for the second biometric-based factor of authentication.

In an embodiment, the gesture authenticator 114 presents a message requesting the user 130 to perform any of the user's registered security gestures for the second biometric-based factor of authentication.

In an embodiment, the gesture authenticator 114 randomly selects one of the user's registered security gestures for each transaction in which the user 130 is being authenticated at the SST 110. The selected security gesture that the gesture authenticator 114 expects to see for authentication is then communicated to the user 130 through the SST 110, such as through an animated character that performs the expected security gesture on a display of the SST 110, text presented on the display, and/or spoken audio instructions communicated through speakers of the SST 110.

In addition to the two biometric-based factors of authentication, the system 100 supports still additional factors that can be used in combination with the two-biometric-based factors or used in additional factors.

For example, the facial recognition 113, during an initial configuration and training period of a configured period of time, obtains sample pixel points from images of the BC 120 from the image sampler 116. The facial recognition 113 also learns the different degrees of light brightness, intensity, and colors for each of the sampled pixel points based on the time of day, day of week, calendar day, etc. The pixel values for sampled pixel points can change based on the light attributes (brightness, intensity, even colors). The time of day, weather outside, and day of year can also affect the light attributes of pixel values for the sampled pixel points (the sun typically rises and sets at different times of the year, a storm during daylight hours, etc.).

In an embodiment, the initial configuration and training period of the configured time period is 24 hours (1 full day).

During subsequent operation, the facial recognition 113 uses the image sampler 116 to continually train and update when the SST 110 is not in use by a user 130. This continual training allows the facial recognition 113 to separate objects that are not stationary from permanent objects in the BC 120, for example a window frame is stationary (likely permanent) but what is detected through the window changes and the window may be covered with shades or curtains or blocked by another object subsequent to the initial training period. Pictures and wall color may also change and objects can be added and removed from the BC 120. For an SST 110 situated outdoors, the facial recognition can continual learn through the training permanent objects versus transitory objects (such as stop signs, roads, trees, buildings, street lights, a fallen tree from a storm, a building being constructed, etc.).

In an embodiment, the facial recognition 113 may also have access to the current weather conditions for the geographical location where the SST 110 is situated through a network connection. This allows the initial and ongoing dynamic training to learn the expected light attributes for the sampled pixel points based on the current weather.

The camera 111 and the additional cameras 112 (which are stationary within the environment of the SST 110) collect images from the BC 120 and the images are obtained by the image sampler 116. The sampled pixel points are extracted and the pixel values are collected for comparison by the sampler 116 against what was previously collected and expected for those pixel points. Any deviation in lighting attributes (intensity, color, brightness) triggers a refresh for the sampler 116 to perform a renewed sampling of the pixel points, which sets the pixel values for the newly sampled pixel points.

When the user 130 is standing in front of the SST 110 and is attempting to authenticate for access to the SST 110 or an account associated with the user 130, the facial recognition 113 processing is performed utilizing facial recognition processing that samples points from the background, if the sampled points are not within a predefined threshold of what is expected for the user 130, the authentication fails.

In an embodiment, the facial recognition 113 performs a depth analysis of the image captured by the camera 111 to determine whether there is sufficiently detected depth detectable from the captured image of the user's face. This can be achieved through color analysis because printed images have distinctive colors that do not match normal skin tones or may have excessive amounts of a particular color based on the quality of the printer. Abnormalities between a printed image and a live image of a face may also be detected. Scale of the image captured versus a known scale for the FOV of the camera 111 can also be used to detect the abnormalities between a live image of the user's face versus a live image of a printed image of the user's face. When the depth appears to not be present, based on a threshold value, the facial recognition fails and authentication of the user 130 is denied.

However, when the sampled points are within the predefined threshold, authentication is not over as would typically be the case for biometric facial recognition. Rather, the facial recognition 113 consults the sampler for sampled pixel points from the BC 120. The facial recognition 113 then determines whether the sampled points from the BC 120 are within an expected tolerance (threshold) and if they are authentication of the user is confirmed, when they are not authentication fails.

Thus, the sampler 116 augments and enhances the first biometric factor of authentication performed by the facial recognition 113 for background authentication in addition to the facial authentication. The sampler 116 can also be used with the second biometric factor of the security gesture.

In still another case, the image selector authenticator 115 is processed to provide another authentication factor. Initially, when the user 130 registers for facial and security gesture authentication, the user is asked through an interface to register a security color or security object. As part of the authentication processing, the user 130 is presented with a randomly generated picture of a scene, such as the scene presented in the FIG. 1C. The user 130 is then asked to select the user's registered security color by swiping on the display of the SST 110 over an object presented in the scene having the user's security color. This can be done with objects presented within the scene as well. For example, the user 130 can register a car and when the randomly generated scene is presented the user 130 is asked to swipe over his security object. This additional authentication provides a Personal Identification Number (PIN) type security that can augment the above-noted biometric-based authentication factor for even greater security.

The timing of using the additional image factor authenticator 115 for added and enhanced security can be random or predefined. That is, the facial, background, and gesture-based authentication can occur first and then the user is presented with a scene to select the user's security color or object. Alternatively, the user may be asked initially to select the security color or object from the randomly generated scene and then facial, background, and security gesture authentication is processed.

Consider the following example in which a user 130 is authenticated for access to a user's account at the SST 110. The user 130 stands in front of the SST 110. The user 130 enters his card into a card reader and selects a transaction. The transaction requests that the user 130 enter a PIN, the PIN is authenticated as a first authentication mechanism. Next, the image factor authenticator 116 randomly generates a scene (such as the scene presented in the FIG. 1C) and the user 130 is asked to swipe the user's registered security color as a second authentication mechanism. The camera 111 captures the user's face and the facial recognition 113 performs authentication on the image of the user's face as well as on the background in the image for the BC 120 as third and fourth authentication mechanisms. Finally, the gesture authenticator 114 asks the user 130 to perform a security gesture previously registered by the user 130 as a fifth authentication mechanism.

It is to be noted, that when the security gesture authentication is processed can be user defined as well. For example, suppose that a user 130 wants to require additional authentication beyond what is typically required for any transaction withdrawing greater than $500 for any transaction. The SST 110 is an Automated Teller Machine (ATM) in this example. The user 130 is authenticated using the standard PIN authentication but when the user selects a withdraw amount of $1000, the gesture authenticator is triggered and the user 130 is authenticated for a user-performed security gesture before the ATM allows the user 130 to obtain the $1000.

Moreover, the security gesture authentication can be implemented outside of an SST 110 context and used to enhance device security with any facial biometric authentication. For example, phones are now performing facial authentication before granting user access, but this can be circumvented with pictures of the legitimate user. The security gesture authentication can be processed by the phone to require a registered user 130 security gesture before providing access to the phone.

The security authentication can be processed to add an extra layer of security with a second biometric-based authentication that augments facial authentication when any network or device-based resource requires additional security for access. A resource can include a physical device, a software application/service, and/or file/document.

Figure 1B:
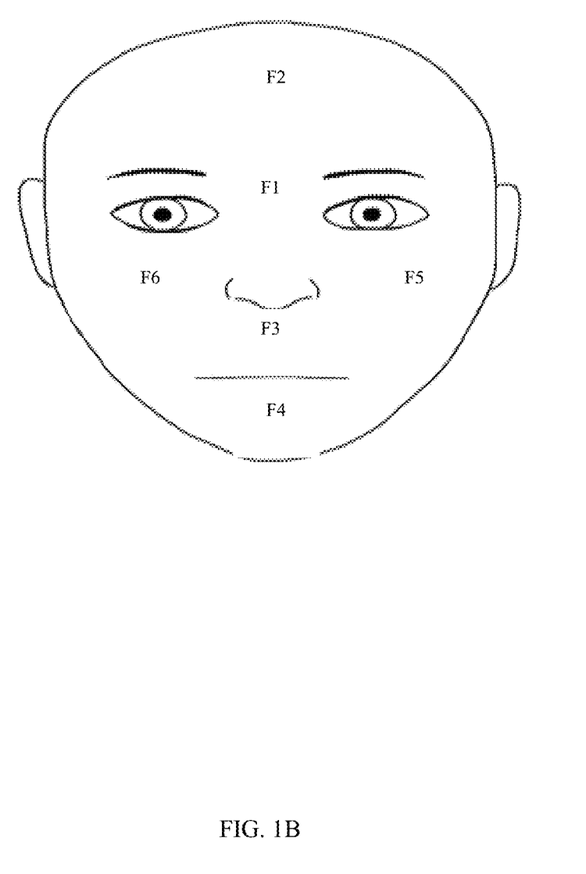
FIG. 1B is a diagram of sampled points of information processed from a facial image of a user for initial facial authentication, according to an example embodiment.
Figure 1C:
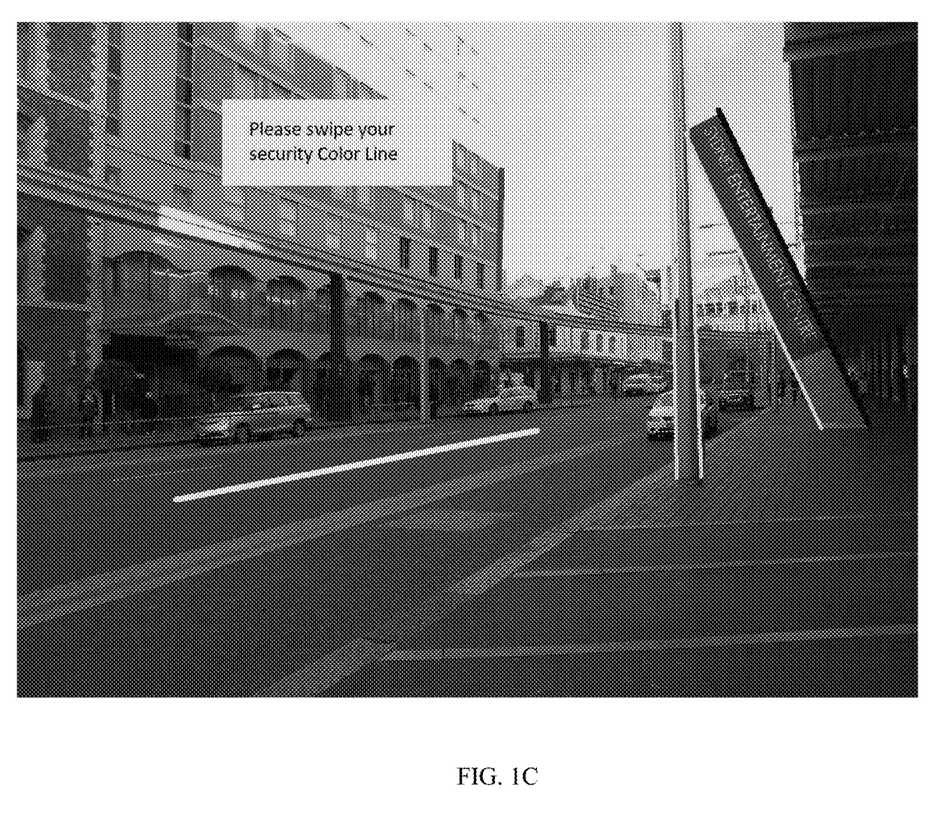
FIG. 1C is a diagram of a sample image for which a user-defined security color is selected as an additional factor for authentication, according to an example embodiment.
Figure 1D:
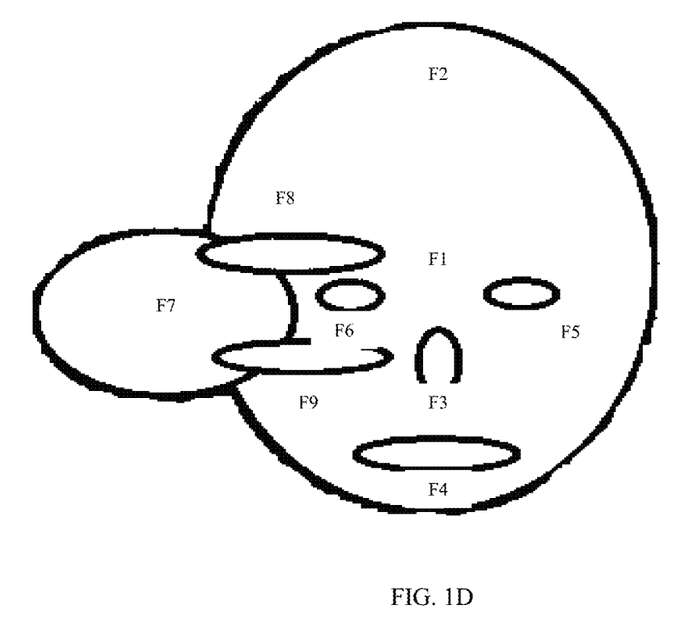
FIG. 1D is a diagram of sampled points of information processed for a security gesture of a user as a security gesture factor for authentication, according to an example embodiment.

It is to be noted that many more pixel points are processed for the facial recognition 113 from what is illustrated in the FIG. 1B; this was done in the interest of comprehension. Similarly, the can be many more gesture-based pixel points beyond what is illustrated in the FIG. 1D. Therefore, the embodiments presented herein are not restricted to a certain total number of sampled pixel points, since the total number of sampled pixel points for the image of a face, objects in the BC 120, and/or for the security gesture can be configured as processing parameters and even dynamically adjusted/changed through a machine-learning process.

The system 100 prevents attempts made by a user 130 to authenticate via facial recognition through presentation of a video (on a display of a user-operated mobile device) or an image (printed image or displayed image on a display of a user-operated mobile device) of the user within the FOV of the camera 111 during the facial authentication of a user 130. This is achieved through the security gesture processing discussed above and can include additional background image-based authentication.

In an embodiment, the additional (stationary) cameras 112 may also be used by the sampler 116 for training the facial recognition 113.

In an embodiment, the system 100 can be implemented into any computing device, such as a desktop computer, laptop, tablet, phone, wearable processing device, an appliance, a vehicle, an aircraft, a ship, and/or a device that is part of the Internet-of-Things (IoTs).

In an embodiment, the facial recognition 113, the gesture authenticator 114, the image selector authenticator 115, and the sampler 116 can be implemented on a server or cloud processing environment through which facial authentication is performed over a network connection on behalf of the SST 110 or any networked primarily stationary computing device.

In an embodiment, the SST 110 operates in a mode of operation in which a clerk assists a customer (Point-Of-Sale (POS) terminal), and the facial authentication can be processed to authenticate the clerk for access to the POS terminal and/or customers being served by the clerk at the POS terminal.

In an embodiment, the SST 110 is an ATM.

In an embodiment, the SST 110 is a kiosk. In an embodiment, the kiosk is a travel kiosk.

These and other embodiments are now discussed with reference to the FIGS. 2-4.

Figure 2:
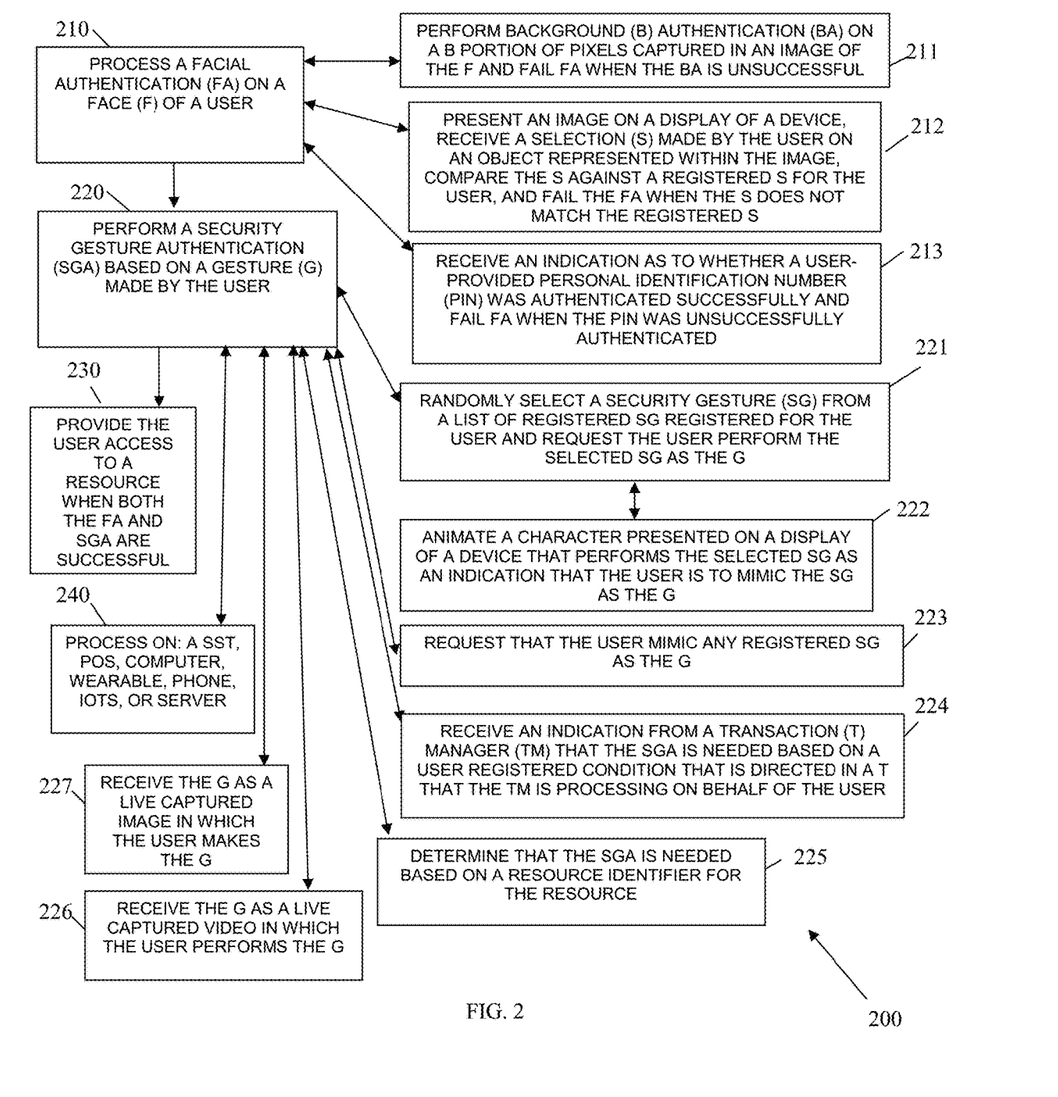
FIG. 2 is a diagram of a method for security gesture authentication, according to an example embodiment.

FIG. 2 is a diagram of a method 200 for security gesture authentication, according to an example embodiment. The software module(s) that implements the method 200 is referred to as a "security gesture authenticator." The security gesture authenticator is implemented as executable instructions programmed and residing within memory and/or a non-transitory computer-readable (processor-readable) storage medium and executed by one or more hardware processors of a hardware computing device. The processors of the device that executes the security gesture authenticator are specifically configured and programmed to process the security gesture authenticator. The security gesture authenticator has access to one or more networks during its processing. The networks can be wired, wireless, or a combination of wired and wireless.

In an embodiment, the device that executes the security gesture authenticator is the SST 110. In an embodiment, the SST 110 is an ATM. In an embodiment, the SST 110 is a kiosk. In an embodiment, the SST 110 operates in a clerk-assisted mode of operation where a clerk operates the SST 110 to perform transactions on behalf of a customer during checkout.

In an embodiment, the device that executes the security gesture authenticator is a server.

In an embodiment, the device that executes the security gesture authenticator is a stationary computing device.

In an embodiment, the device that executes the security gesture authenticator is a portable and mobile device including one of: a wearable processing device, a tablet, a laptop, a phone, and a device that is part of the IoTs.

In an embodiment, the security gesture authenticator is all or some combination of the modules 113, 114, 115, and/or 116.

At 210, the security gesture authenticator processes a facial authentication on a face of a user. For example, by processing the facial recognition 113 discussed above with the FIGS. 1A-1D. A camera integrated into a device that processes the security gesture authenticator or interfaced to the device captures an image of the user's face and performs facial authentication.

According to an embodiment, at 211, the security gesture authenticator performs background authentication on a background portion of pixels captured in an image of the face. For example, by processing the background image sampler 116. The security gesture authenticator fails the facial authentication when the background authentication is unsuccessful.

In an embodiment, at 212, the security gesture authenticator presents an image on a display of a device, receives a selection made by the user on an object represented within the image, compares the selection against a registered selection for the user, and fails the facial authentication when the selection does not match the registered selection. For example, by processing the image selector authenticator 115.

In an embodiment, at 213, the security gesture authenticator receives an indication as to whether a user-provided PIN was authenticated successfully and fails the facial authentication when the PIN was unsuccessfully authenticated. This is done through PIN or password authentication processing where the indication of success or failure is accessible to the security gesture authenticator.

The processing 211-213 can be done to supplement and enhance facial authentication as was discussed above with the FIGS. 1A-1D.

At 220, the security gesture authenticator performs a security gesture authentication based on a gesture made by the user. For example, by processing the gesture authenticator 114 discussed above with the FIGS. 1A-1D.

According to an embodiment, at 221, the security gesture authenticator randomly selects a security gesture from a list of registered security gestures registered for the user, and the security gesture authenticator requests the user perform the selected security gesture as the gesture being provided by the user.

In an embodiment of 221 and at 222, the security gesture authenticator animates a character presented on a display of a device that performs the selected security gesture as an indication that the user is to mimic the security gesture being animated as the gesture.

In an embodiment, at 223, the security gesture authenticator requests that the user mimic any registered security gesture as the gesture.

In an embodiment, at 224, the security gesture authenticator receives an indication from a transaction manager that the security gesture authentication is needed based on a user-registered condition that is detected in a transaction that the transaction manager is processing on behalf of the user. Here, the user decides and registers the condition and when the condition is detected with a transaction, the security gesture authentication is processed.

In an embodiment, at 225, the security gesture authenticator determines that the security gesture authentication is needed based on a resource identifier for the resource. The resource can be a physical device (safe, storage, processing device), a software application/service, or a file/document.

In an embodiment, at 226, the security gesture authenticator receives the gesture as a live captured video in which the user performs the gesture.

In an embodiment, at 227, the security gesture authenticator receives the gesture as a live captured image in which the user makes the gesture.

At 230, the security gesture authenticator provides the user with granted access to a resource when both the facial authentication and the security gesture authentication are successful.

In an embodiment, at 240, the security gesture authenticator processes on one of: a SST, a POS terminal, a laptop computer, a tablet computer, a phone, a wearable processing device, a desktop computer, a server, and a device that is part of the IoTs.

Figure 3:
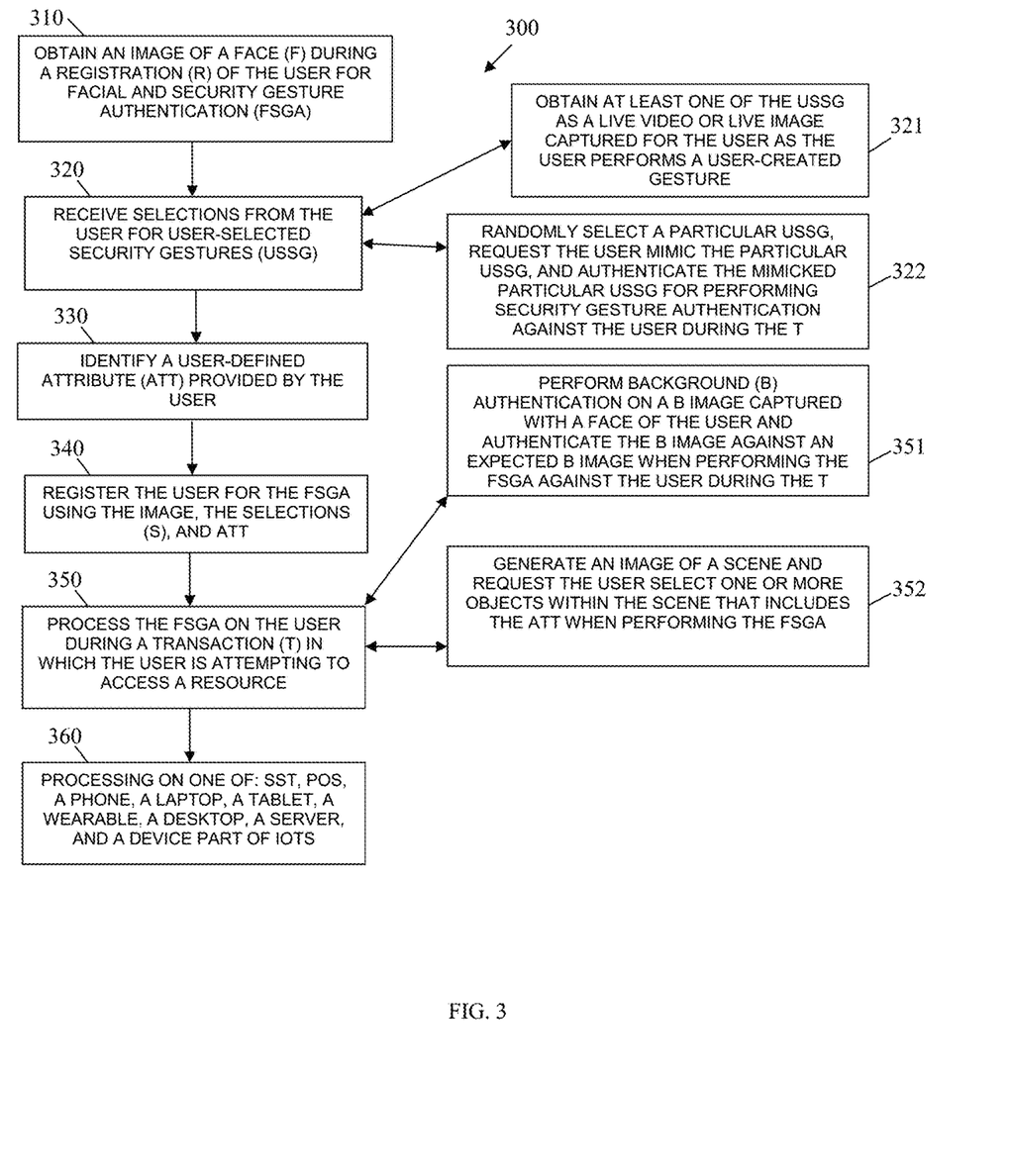
FIG. 3 is a diagram of another method for security gesture authentication, according to an example embodiment.

FIG. 3 is a diagram of another method 300 for security gesture authentication, according to an example embodiment. The software module(s) that implements the method 300 is referred to as a "facial and gesture authenticator." The facial and gesture authenticator is implemented as executable instructions programmed and residing within memory and/or a non-transitory computer-readable (processor-readable) storage medium and executed by one or more hardware processors of a hardware computing device. The processors of the device that executes the facial and gesture authenticator are specifically configured and programmed to process the facial and gesture authenticator. The facial and gesture authenticator has access to one or more networks during its processing. The networks can be wired, wireless, or a combination of wired and wireless.

In an embodiment, the device that executes the facial and gesture authenticator is the SST 110. In an embodiment, the SST 110 is an ATM. In an embodiment, the SST 110 is a kiosk. In an embodiment, the SST 110 operates in a clerk-assisted mode of operation where a clerk operates the SST 110 to perform transactions on behalf of a customer during checkout.

In an embodiment, the device that executes the facial and gesture authenticator is a server.

In an embodiment, the device that executes the facial and gesture authenticator is a stationary computing device.

In an embodiment, the device that executes the facial and gesture authenticator is one of: a tablet, a laptop, a phone, a wearable processing device, and a device that is part of the IoTs.

In an embodiment, the facial and gesture authenticator is all or some combination of the modules 113, 114, 115, 116, and/or the method 200.

At 310, the facial and gesture authenticator obtains an image of a face of a user during a registration of the user for facial and security gesture authentication.

At 320, the facial and gesture authenticator receives selections from the user for user-selected security gestures.

According to an embodiment, at 321, the facial and gesture authenticator obtains at least one of the user-selected security gestures as a live video or a live image captured for the user as the user performs a user-created gesture. The user adds a new security gesture that the user created in this processing.

At 330, the facial and gesture authenticator identifies a user-defined security attribute provided by the user. This can be a color or an object or any attribute associated with a specific object.

At 340, the facial and gesture authenticator registers the user for the facial and security gesture authentication using the image, the selections, and the user-defined security attribute.

At 350, the facial and gesture authenticator processes the facial and security gesture authentication on the user during a transaction in which the user is attempting to access a resource.

In an embodiment, at 351, the facial and gesture authenticator randomly selects a particular one of the user-selected security gestures, requests the user mimic the particular security gesture, and authenticates the mimicked particular security gesture for performing security gesture authentication against the user during the transaction.

In an embodiment, at 352, the facial and gesture authenticator performs background authentication on a background image captured with a face of the user and authenticates the background image against an expected background image when performing the facial and security gesture authentication against the user during the transaction.

In an embodiment, at 353, the facial and gesture authenticator generates an image of a scene and requests the user to select one or more objects within the scene that includes the user-defined security attribute when performing the facial and security gesture authentication.

According to an embodiment, at 360, the facial and gesture authenticator processes on one of: a SST, a POS terminal, a phone, a laptop computer, a tablet computer, a wearable processing device, a desktop computer, a server, and a device that is part of the IoTs.

Figure 4:
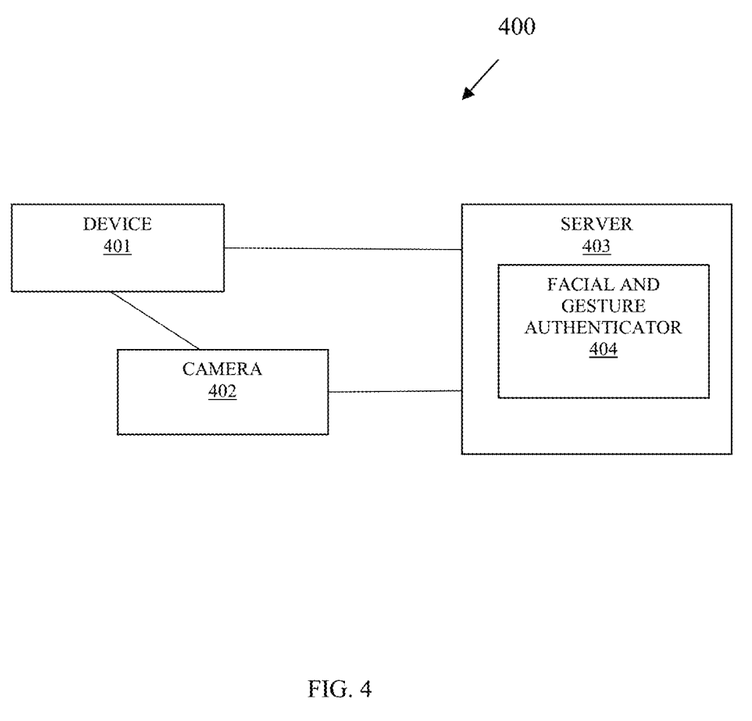
FIG. 4 is a diagram of another system for security gesture authentication, according to an example embodiment.

FIG. 4 is a diagram of another system 400 for facial and gesture authentication, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1D and 2-3.

In an embodiment, the system 400 implements, inter alia, the method 200 of the FIG. 2.

In an embodiment, the system 400 implements, inter alia, the method 300 of the FIG. 3.

The system 400 includes a device 401, at least one camera 402, and a server 403 having a facial and gesture authenticator 404.

In an embodiment, the device 401 is a SST. In an embodiment, the SST is an ATM. In an embodiment, the SST is a kiosk. In an embodiment, the SST operates in a customer-assisted mode of operation as a POS terminal operated by a clerk (type of user) that assists a customer (another type of user) in performing checkout operations at the POS terminal.

In an embodiment, the device 401 is one of: a wearable processing device, a tablet, a phone, a laptop, and a device that is part of the IoTs.

The facial and gesture authenticator 404 is configured to: 1) execute on at least one hardware processor of the server 403, 2) dynamically perform facial authentication on a face of a user during a transaction being processed on the device 401, 3) dynamically perform security gesture authentication on a gesture made by the user during the transaction, and 4) provide an indication to the device 401 as to whether the user was successfully authenticated for the facial authentication and the security gesture authentication for the user to continue with the transaction on the device 401.

In an embodiment, the facial and gesture authenticator 404 is all or some combination of: the modules 113, 114, 115, 116, the method 200, and/or the method 300.

The system 400 illustrates that a transaction can be processed on a device 401 being operated by a user with the facial and security gesture authentication being processed on a remote server 403.

In an embodiment, the transaction is for unlocked access to the device 401, such as a user's access to a phone (the phone being the device 401).

In an embodiment, the transaction is a financial transaction on an ATM (the ATM being the device 401).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   processing a facial authentication on a face of a user comprising a facial recognition on the face and a depth analysis on a captured image of the face that determines a detected depth of the face within the captured image by using color analysis and determining when the captured image is taken of the face of the user and when the captured image is taken from a user-presented image of the face associated with the user, wherein processing the depth analysis further includes comparing image colors for the captured image against known first distinctive colors associated with printed images and known second distinctive colors associated with skin tones, comparing a scale of the captured image against a known scale for a field of view of a camera that captures the image, determining based on first abnormalities between the image colors as compared against the known first distinctive colors and the known second distinctive colors and determining based on second abnormalities of the scale of the captured image as compared to the known scale whether the captured image is the face of the user or is the user-presented image; and
   performing a security gesture authentication based on a gesture made by the user; and
   providing the user access to a resource when both the facial authentication and the security gesture authentication are successful.

2. The method of claim 1, wherein processing further includes performing background authentication on a background portion of pixels captured in an image of the face and failing the facial authentication when the background authentication is unsuccessful.

3. The method of claim 1, wherein processing further include presenting an image on a display of a device, receiving a selection made by the user on an object represented within the image, comparing the selection against a registered selection for the user, and failing the facial authentication when the selection does not match the registered selection.

4. The method of claim 1, wherein processing further includes receiving an indication as to whether a user-provided Personal Identification Number (PIN) was authenticated successfully and failing the facial authentication when the PIN was unsuccessfully authenticated.

5. The method of claim 1, wherein performing further includes randomly selecting a security gesture from a list of registered security gestures registered for the user and requesting the user perform the selected security gesture as the gesture.

6. The method of claim 5, wherein requesting further includes animating a character presented on a display of a device that performs the selected security gesture as an indication that the user is to mimic the security gesture as the gesture.

7. The method of claim 1, wherein performing further includes requesting that the user mimic any registered security gesture as the gesture.

8. The method of claim 1, wherein performing further includes receiving an indication from a transaction manager that the security gesture authentication is needed based on a user registered condition that is detected in a transaction that the transaction manager is processing on behalf of the user.

9. The method of claim 1, wherein performing further includes determining that the security gesture authentication is needed based on a resource identifier for the resource.

10. The method of claim 1, wherein performing further includes receiving the gesture as a live captured video in which the user performs the gesture.

11. The method of claim 1, wherein performing further includes receiving the gesture as a live captured image in which the user makes the gesture.

12. The method of claim 1 further comprising, processing the method on one of: a Self-Service Terminal (SST), a Point-Of-Sale (POS) terminal, a laptop computer, a tablet computer, a phone, a wearable processing device, a desktop computer, a server, and a device that is part of the Internet-of-Things (IoTs).

13. A method, comprising:
   obtaining an image of a face of a user during a registration of the user for facial and security gesture authentication;
   receiving selections from the user for user-selected security gestures;
   identifying a user-defined security attribute provided by the user;
   registering the user for the facial and security gesture authentication using the image, the selections, and the user-defined security attribute; and
   processing the facial and security gesture authentication on the user during a transaction in which the user is attempting to access a resource, wherein processing further comprises processing a facial recognition on the face and a depth analysis on a captured image of the face that determines a detected depth of the face within the captured image by using color analysis and determining when the captured image is taken of the face of the user and when the captured image is taken from a user-presented image of the face associated with the user, wherein processing the depth analysis further includes comparing image colors for the image against known first distinctive colors associated with printed images and known second distinctive colors associated with skin tones, comparing a scale of the image against a known scale for a field of view of a camera that captures the image, determining based on first abnormalities between the image colors as compared against the known first distinctive colors and the known second distinctive colors and determining based on second abnormalities of the scale of the image as compared to the known scale whether the image is the face of the user or is the user-presented image.

14. The method of claim 13 further comprising, processing the method on one of: a Self-Service Terminal (SST), a Point-Of-Sale (POS) terminal, a phone, a laptop computer, a tablet computer, a wearable processing device, a desktop computer, a server, and a device that is part of the Internet-of-Things (IoTs).

15. The method of claim 13, wherein receiving further includes obtaining at least one of the user-selected security gestures as a live video of a live image captured for the user as the user performs a user-created gesture for the at least one of the user-selected security gestures.

16. The method of claim 13, wherein processing further includes randomly selecting a particular one of the user-selected security gestures, requesting the user mimic the particular one of the user-selected security gestures, and authenticating the mimicked particular one of the user-security gestures for performing security gesture authentication against the user during the transaction.

17. The method of claim 13, wherein processing further includes performing background authentication on a background image captured with a face of the user and authenticating the background image against an expected background image when performing the facial and security gesture authentication against the user during the transaction.

18. The method of claim 13, wherein processing further includes generating an image of a scene and requesting the user select one or more objects within the scene that includes the user-defined security attribute when performing the facial and security gesture authentication.

19. A system (SST), comprising:
a device;
at least one camera interfaced to the device; and
a server having a facial and gesture authenticator;
wherein the facial and gesture authenticator is configured to: (i) execute on at least one hardware processor of the server; (ii) dynamically perform facial authentication on a face of a user during a transaction being processed on the device by performing a facial recognition on the face and a depth analysis on a captured image of the face that determines a detected depth of the face within the captured image by using color analysis and determining when the captured image is taken of the face of the user and when the captured image is taken from a user-presented image of the face associated with the user by comparing image colors for the captured image against known first distinctive colors associated with printed images and known second distinctive colors associated with skin tones, comparing a scale of the captured image against a known scale for a field of view of a camera that captures the image, determining based on first abnormalities between the image colors as compared against the known first distinctive colors and the known second distinctive colors and determining based on second abnormalities of the scale of the captured image as compared to the known scale whether the captured image is the face of the user or is the user-presented image, (iii) dynamically perform security gesture authentication on a gesture made by the user during the transaction, and (iii) provide an indication to the device as to whether the user was successfully authenticated for the facial authentication and the security gesture authentication for the user to continue with the transaction on the device.

20. The system of claim 19, wherein the device is one of: an Automated Teller Machine (ATM), a kiosk, a Point-Of-Sale (POS) terminal operated in a customer-assistance mode of operation for the SST, a laptop computer, a desktop computer, a tablet computer, a phone, a wearable processing device, and a device that is part of the Internet-of-Things (IoTs).

* * * * *